(12) United States Patent
Taya (10) Patent No.: US 9,243,935 B2
(45) Date of Patent: Jan. 26, 2016

(54) DISTANCE INFORMATION ESTIMATING APPARATUS

(71) Applicant: CANON KABUSHIKI KAISHA, Tokyo (JP)

(72) Inventor: Kaori Taya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/973,321

(22) Filed: Aug. 22, 2013

(65) Prior Publication Data

US 2014/0063235 A1 Mar. 6, 2014

(30) Foreign Application Priority Data

Aug. 31, 2012 (JP) .................................. 2012-191315

(51) Int. Cl.
*G06K 9/00* (2006.01)
*G01D 5/39* (2006.01)
*G01B 11/245* (2006.01)
*G06T 7/00* (2006.01)

(52) U.S. Cl.
CPC ................ *G01D 5/39* (2013.01); *G01B 11/245* (2013.01); *G06T 7/0065* (2013.01); *G06T 2207/10016* (2013.01); *G06T 2207/20016* (2013.01); *G06T 2207/20221* (2013.01)

(58) Field of Classification Search
CPC ................... G01B 11/245; G01D 5/39; G06T 2207/20221
See application file for complete search history.

(56) References Cited

U.S. PATENT DOCUMENTS

| 8,153,971 | B2 * | 4/2012 | Strandemar | G01J 5/02 250/330 |
| 8,229,172 | B2 * | 7/2012 | Wong | G06T 7/0069 382/106 |
| 8,878,773 | B1 * | 11/2014 | Bozarth | G06K 9/00604 345/156 |
| 9,088,772 | B2 * | 7/2015 | Koizumi | H04N 13/0014 |
| 2009/0052796 | A1 | 2/2009 | Furukawa et al. | |
| 2010/0054579 | A1 | 3/2010 | Okutomi et al. | |
| 2012/0019625 | A1 | 1/2012 | Mishima et al. | |
| 2012/0229628 | A1 * | 9/2012 | Ishiyama et al. | 348/135 |
| 2012/0230606 | A1 * | 9/2012 | Sugiyama et al. | 382/284 |
| 2013/0223759 | A1 * | 8/2013 | Nishiyama | 382/284 |
| 2014/0063235 | A1 * | 3/2014 | Taya | 348/140 |
| 2014/0064633 | A1 * | 3/2014 | Taya | G06T 5/001 382/261 |

FOREIGN PATENT DOCUMENTS

JP 2008-123019 A 5/2008
JP 2012-029168 A 2/2012

* cited by examiner

*Primary Examiner* — Gregory M Desire
(74) *Attorney, Agent, or Firm* — Fitzpatrick, Cella, Harper & Scinto (57) ABSTRACT

A method estimates the distance of a flat part while maintaining the precision needed for estimating the distance in detail. Distance information is estimated by estimating each piece of distance information of an image represented by image data, and distance information represented by resolution-converted image data, and combining the distance information of the image and the distance information of the resolution-converted image.

17 Claims, 10 Drawing Sheets

DISTANCE INFORMATION ESTIMATING APPARATUS

BACKGROUND OF THE INVENTION

1. Field of the Invention

The present invention relates to a distance information estimating apparatus which can estimate the distance from at least one image.

2. Description of the Related Art

A multi-viewpoint image includes a plurality of viewpoint images captured at the same time by a so-called camera array (known as camera array system, multiple lens camera, and the like), a plurality of viewpoint images captured by sequentially moving a viewpoint (an image capture position) of one still camera, or a plurality of viewpoint images created by sampling a video image captured by a video camera. In a case of calculating distance information to an object included in the viewpoint images, or generating an image of an optional viewpoint including a viewpoint which does not carry out image capture, parallax information corresponding to a viewpoint interval is necessary.

In order to extract parallax information from a multi-viewpoint image, there has been developed a multi-viewpoint image processing apparatus which obtains corresponding information of individual pixels in two images which are optionally selected from among a group of viewpoint images.

In the multi-viewpoint image processing apparatus, with regard to a certain pixel (a target point) on one captured image, a corresponding pixel (a corresponding point) is specified on the other captured image. A parallax about these pixels, that is, a displacement amount between a position of the target point in one image and a position of the corresponding point on the other image corresponding to the target point is calculated as the parallax.

Here, a matching process for specifying the corresponding point on the other image for the target point on one image between two images has various methods. For example, there is an area-based method of specifying the corresponding point by using a pixel block which is constructed by a plurality of pixels including a target point on one image as a template, and determining a correlation between the template and each of areas on the other image. Further, there is a feature-based method of extracting a feature which includes a target point on one image to specify the corresponding point on the other image on the basis of the feature.

In any of the area-based method and the feature-based method, a search area is set on the basis of a coordinate of the target point on one image, a correlation degree is determined about each of candidates of the corresponding point in the search area, and a pixel having the highest correlation degree is selected as the corresponding point, on the other image. In a case where the camera posture or a distortion is known, it is possible to estimate the depth of the corresponding points according to a triangulation method.

Further, there has been proposed a technique of estimating the distance from a picture composition of one image. For example, the depth can be estimated by analyzing a feature amount of the image, for example, a blur degree and the picture composition, and associating the feature amount with previously set depth information.

According to a method described in US 2009/0052796 A1, the feature-based method and the area-based method are mixed, the feature point is extracted, and a small pixel block (hereinafter, referred to as a patch) is generated around the feature point. The small patch is sequentially generated in the vicinity of the feature point by performing sorting out of the patch in which the patch is adopted, in a case where the patch can be viewed from a plurality of cameras. As a result, precise distance information estimation can be carried out.

According to a method described in Japanese Patent Laid-Open No. 2008-123019, the feature-based method and the area-based method are mixed, one of a plurality of images in which the camera positions are known is set as a standard image, and a two-dimensional mesh constituted by a plurality of triangles is generated on the standard image. It is possible to estimate the distance information of the image by determining the distance of each of apexes of the mesh so that the two-dimensional mesh converted into a viewpoint of the reference images other than the standard image coincides with the reference image most closely.

According to a method described in Japanese Patent Laid-Open No. 2012-029168, it is possible to estimate the distance information of an image by analyzing an image picture composition even from one image and collating it with a previously prepared depth structure pattern.

However, the methods according to US 2009/0052796 A1 and Japanese Patent Laid-Open No. 2008-123019 have a problem that the parallax of a flat part of the image can not be determined.

In the method according to US 2009/0052796 A1, the corresponding patch to the patch as seen from the other viewpoint can not be uniquely defined in a flat part which is a certain degree larger than the magnitude of the patch.

In the method according to Japanese Patent Laid-Open No. 2008-123019, the corresponding point to each of the apexes of the mesh as seen from the other viewpoint can not be uniquely determined in a flat part which is a certain degree larger than the magnitude of the mesh.

Since the method according to Japanese Patent Laid-Open No. 2012-029168 estimates on the basis of the previously prepared structure patterns, it is hard to carry out an estimation having a high precision, for example, a fine irregularity.

SUMMARY OF THE INVENTION

The present invention provides a method which can also estimate the distance of a flat part while keeping the precision for estimating the distance in detail.

A distance estimating apparatus according to the present invention has an acquiring unit configured to acquire image data and resolution-converted image data, the resolution-converted image data being obtained by converting a resolution of the image data, a distance information estimating unit configured to estimate each of distance information of an image represented by the image data and distance information of a resolution-converted image represented by the resolution-converted image data, and a distance information combining unit configured to combine the distance information of the image and the distance information of the resolution-converted image.

According to the present invention, it is possible to estimate the distance of a flat part while maintaining the precision for estimating the distance in detail.

Further features of the present invention will become apparent from the following description of exemplary embodiments (with reference to the attached drawings).

DESCRIPTION OF THE EMBODIMENTS

A description will be provided in detail below of the present invention on the basis of a preferred embodiment with reference to the accompanying drawings. The structure shown in the following embodiments is only an example, and the present invention is not limited to the shown structure.

Embodiment 1

The present embodiment shows an example which carries out a distance estimation having a high coverage and a high precision by searching a feature point with a plurality of resolutions and combining results obtained by the distance estimation.

"Distance information" determined in the present embodiment is the distance of a point corresponding to a pixel of an image from a camera position. In a case where the result of the distance estimation is obtained in a world coordinate, in order to associate the result of estimation with a position on the image and the distance information, the world coordinate is first converted into a camera coordinate, and the camera coordinate is converted into an image coordinate. Note that the camera coordinate refers to a coordinate system in which a camera position is set to an origin, the vertical direction of the camera is set to a y-axis, the horizontal direction thereof is set to an x-axis, and an axis which is orthogonal to the x-axis and the y-axis and passes through a center of the camera is set to a z-axis, and the image coordinate is a coordinate in which the center of the image is set to an origin, the vertical direction is set to a y-axis, the horizontal direction is set to an x-axis, and a unit is set to pixel.

The conversion from the world coordinate into the camera coordinate is carried out as follows. For example, on the assumption that a point of the world coordinate is set to $Pw=(x, y, z)$, a point of the camera coordinate is set to Pc, the world coordinate of a camera position is set to $C=(Cx, Cy, Cz)$, and respective unit vertical vectors in x-axis, y-axis and z-axis directions of the camera coordinate are set to Rx, Ry, Rz, the conversion can be expressed by the following coordinate conversion formula.

$$Pc=(Pw-C)*[Rx,Ry,Rz] \quad \text{(Formula 1)}$$

In which "*" means multiplication of matrix, and "[Rx, Ry, Rz]" means matrix in which vertical vectors Rx, Ry, Rz are arranged horizontally.

The conversion from the camera coordinate into the image coordinate can be expressed by the following parse conversion formula on the assumption that a point of the camera coordinate is set to $Pc=(Pc\_x, Pc\_y, Pc\_z)$ and a point of the image coordinate is set to $Pi=(Pi\_x, Pi\_y)$.

$$Pi\_x=Fc*Pc\_x/Pc\_z, Pi\_y=Fc*Pc\_y/Pc\_z \quad \text{(Formula 2)}$$

In which "*" means multiplication and "/" means division. Here, Fc is a constant for associating an image with a camera coordinate, and can be defined by the following Formula 3 from a horizontal resolution res of a camera, a focal distance f and a horizontal width wid of a sensor.

$$Fc=res*f/wid \quad \text{(Formula 3)}$$

Hereinafter, it is assumed that distance information of an image coordinate $(Pi\_x, Pi\_y)$ means a z coordinate $Pc\_z$ in the camera coordinate. However, in a case where the distance information is expressed by the image, the distance information is expressed by performing appropriate shifting and multiplication by constant so that the distance information can be expressed in a range in which tone can be expressed. Note that the distance information is set to the z coordinate of the camera coordinate in the present embodiment, but may be set to a Euclidean distance from a point to a camera position.

$$\text{sqrt}(Pc\_x^2+Pc\_y^2+Pc\_z^2) \quad \text{(Formula 4)}$$

In which "sqrt(x)" means square root of x, and "m^n" means n-th power of m.

Further, in the present embodiment, there is described the example in which the distance is estimated by using the multi-viewpoint image data which is the image obtained from a plurality of viewpoints, but the same process can be achieved by using a method of estimating the distance from one piece of image data which is cited in the prior art.

<Distance Information Estimating Apparatus>

Figure 1:
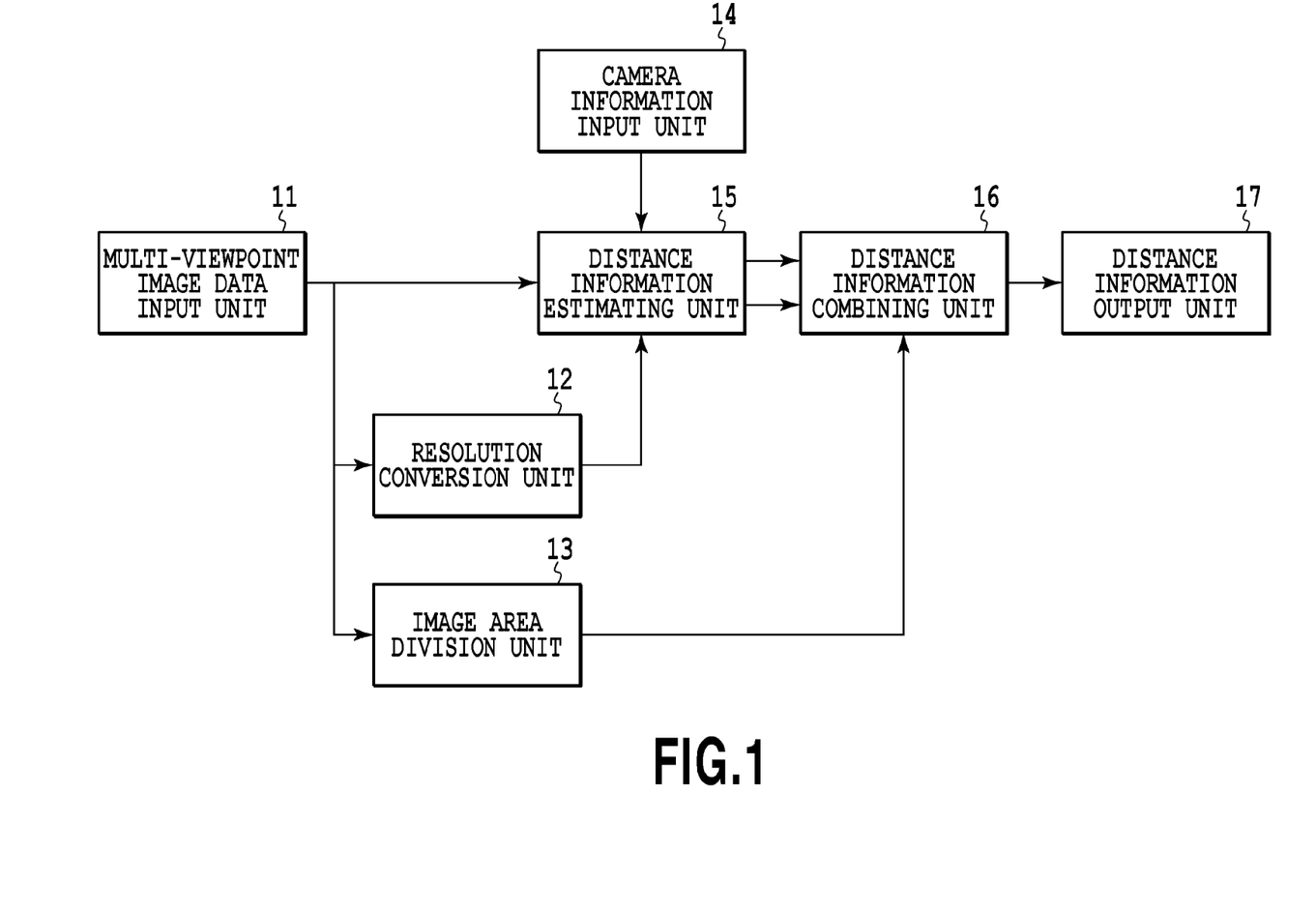
FIG. 1 is a block diagram showing an example of a distance information estimating apparatus in an embodiment 1.

FIG. 1 is a view showing an example of a structure of a distance information estimating apparatus according to the present embodiment. The distance information estimating apparatus according to the present embodiment has a multi-viewpoint image data input unit 11, a resolution conversion unit 12, an image area division unit 13, a camera information input unit 14, a distance information estimating unit 15, a distance information combining unit 16, and a distance information output unit 17.

Figure 2:
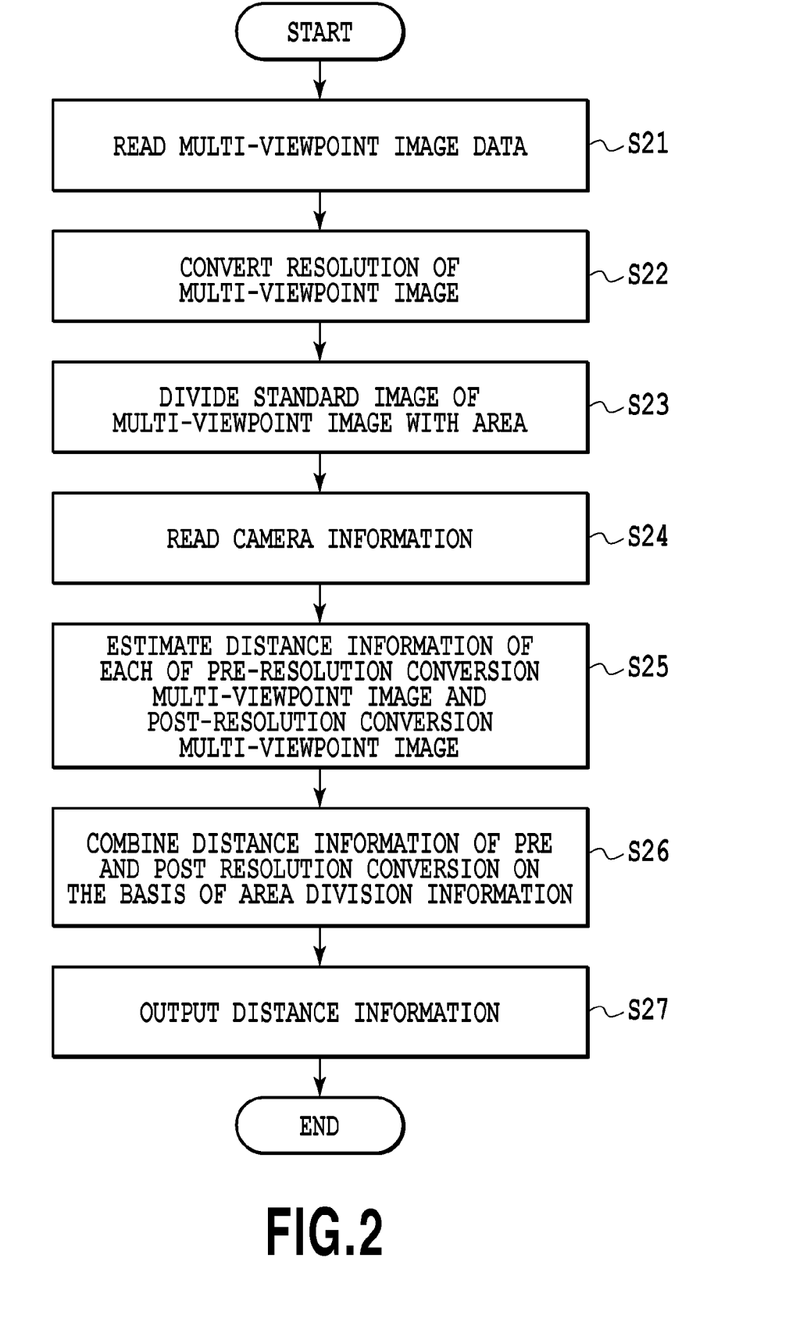
FIG. 2 is a flowchart showing an example of a distance information estimating process in the embodiment 1.

FIG. 2 is a flowchart of a process of the distance information estimating apparatus. A description will be given below of a process flow of the distance information estimating apparatus by using FIGS. 1 and 2.

First, in step S21, the multi-viewpoint image data input unit 11 reads multi-viewpoint image data which represents a multi-viewpoint image. Here, the multi-viewpoint image data is image data which corresponds to at least two images including one standard image and one or more reference images. Three or more images may be included.

Figure 3A:
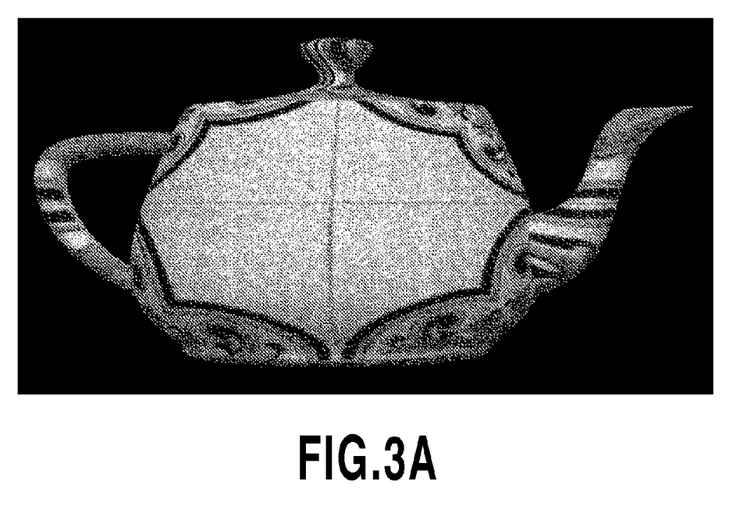
FIGS. 3A and 3B each show an example of a pattern diagram of a resolution conversion process in the embodiment 1.
Figure 3B:
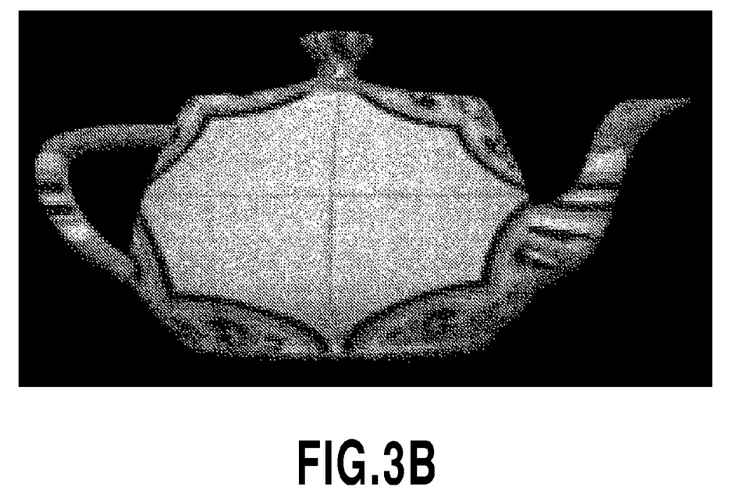

Next, in step S22, the resolution conversion unit 12 converts each of resolutions of the multi-viewpoint images. In other words, the resolution conversion unit 12 converts the resolution of each piece of the image data of the standard image and the reference image, and acquires resolution-converted image data. For example, in a case where FIG. 3A is an input image, an image obtained by reducing the resolution into a quarter is the one shown in FIG. 3B. Further, here, a description will be given of an example having one resolution-converted image, but the same process can be carried out in a case where two or more kinds of resolutions are provided.

Next, in step S23, the image area division unit 13 divides the standard image of the multi-viewpoint image with area. The area division method may employ a general image division method, for example, a mean shift method, a fuzzy c-mean method, a watersheds method or the like.

Next, in step S24, the camera information input unit 14 reads the camera information which corresponds to each piece of the image data of the multi-viewpoint image data. Here, it is assumed that the camera information includes a position (x, y, z) of the camera, an incline (Yaw, Pitch, Roll) of the camera, and a magnification (α). In a case where a distortion of the lens exists, it is desirable that a parameter of distortion is included.

Next, in step S25, the distance information estimating unit 15 estimates distance information of a multi-viewpoint image in pre-resolution conversion and distance information of a multi-viewpoint image in post-resolution conversion by using the camera information obtained in step S24. In other words, the distance information estimating unit 15 carries out a distance estimating process using the standard image and the reference image in pre-resolution conversion, and a distance estimating process using the standard image and the reference image in post-resolution conversion. The distance estimating method may employ the area-based method or the feature point-based method mentioned above. Here, the reason of using images having the different resolutions is that a result of shape estimation is different according to a difference in the resolution.

Figure 4A:
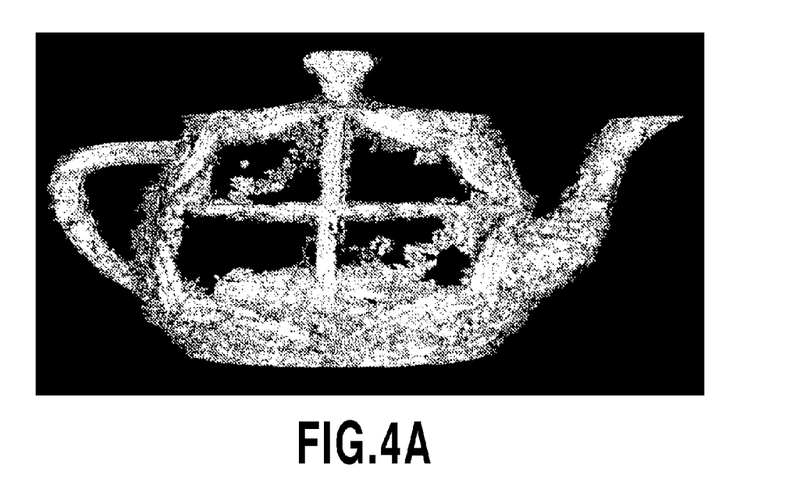
FIG. 4A shows an example of a pattern diagram of a result of distance estimation in pre-resolution conversion in the embodiment 1.
Figure 4B:
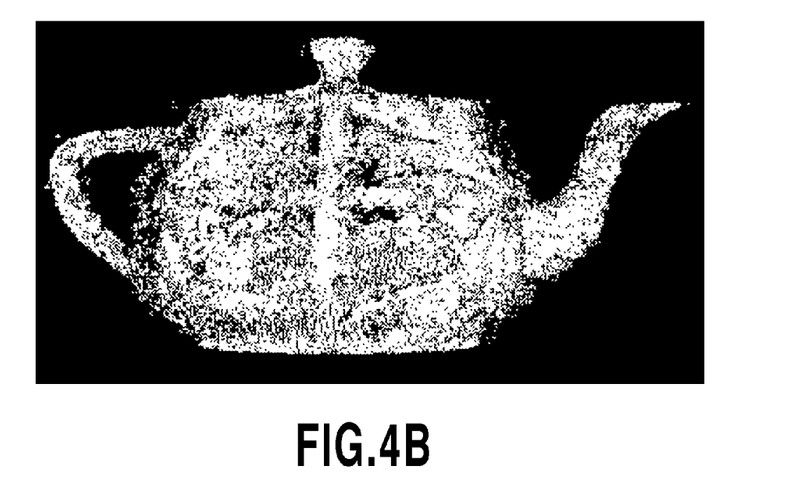
FIG. 4B shows an example of a pattern diagram of a result of distance estimation in post-resolution conversion in the embodiment 1.
Figure 5A:
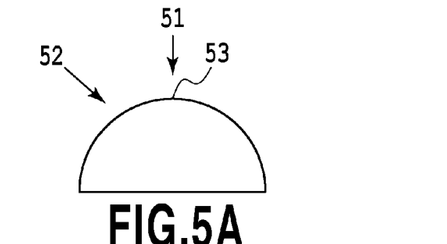
FIGS. 5A to 5C each show an example of a pattern diagram representing a difference in the distance estimation between pre-resolution conversion and post-resolution conversion in the embodiment 1.
Figure 5B:
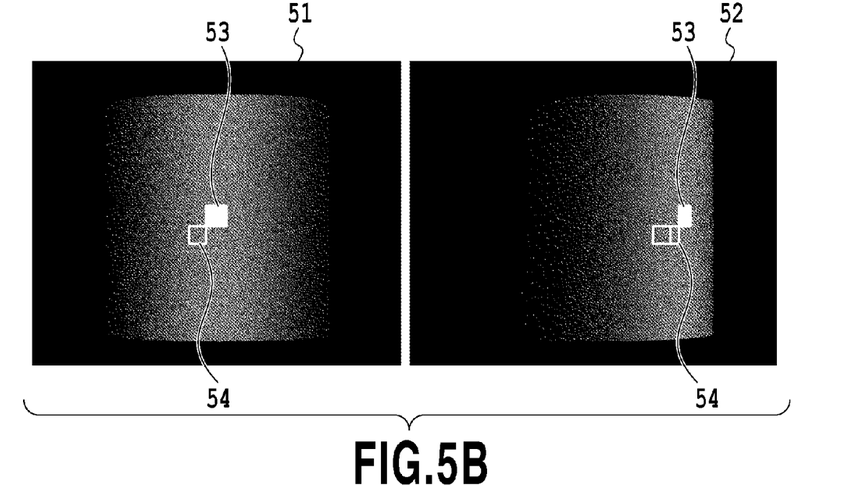
Figure 5C:
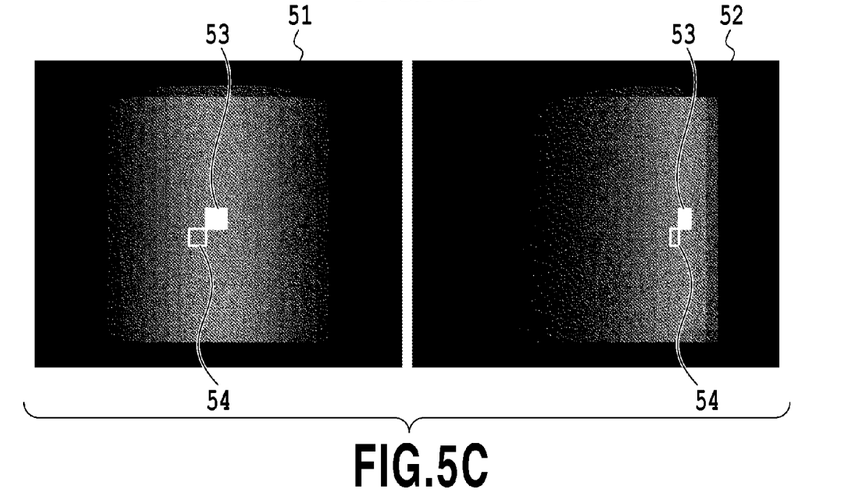

For example, FIG. 4A shows a result of the distance estimation using the multi-viewpoint image without the resolution conversion, and FIG. 4B shows a result of the distance estimation using the multi-viewpoint image in post-resolution conversion (for example, a half resolution) while indicating points in which the distance can be estimated with white color and indicating points in which the distance can not be estimated with black color. Outlined or patterned portions are estimated in more detail in the image without the resolution conversion, while flat portions are estimated in a greater area in the image in post-resolution conversion. Hereinafter, a description will be given of the reason with reference to FIGS. 5A to 5C. FIGS. 5B and 5C show images obtained by viewing an arched figure from a just above viewpoint 51 and from a diagonal viewpoint 52 respectively. It is assumed that a feature point 53 exists in the figure. FIG. 5A shows a positional relationship of these points from a horizontal direction. FIG. 5B is an image without the resolution conversion. FIG. 5C is an image in post-resolution conversion. In a case where a shape of a peripheral area 54 of the feature point 53 is determined, a tone change is smooth in the image without the resolution conversion in FIG. 5B, and therefore it is hard to define a position corresponding to the peripheral area 54 of the viewpoint 51 by the viewpoint 52. On the other hand, since the tone change has a step in the image in post-resolution conversion in FIG. 5C, it is possible to define a position corresponding to the peripheral area 54 of the viewpoint 51 by the viewpoint 52 by utilizing the tone change. Therefore, there is a case where the shape can be defined in the flat area of the image with the lower resolution. However, due to a tradeoff relationship that as the resolution becomes lower, the precision also becomes lower, the lower resolution does not necessarily cause a good result.

Next, in step S26, the distance information combining unit 16 creates distance information which is obtained by combining the distance information of the multi-viewpoint image in pre-resolution conversion, and the distance information of the multi-viewpoint image in post-resolution conversion on the basis of the area division information obtained in step S23. Details of the process will be mentioned later.

Finally, in step S27, the distance information output unit 17 outputs the distance information which is created in step S27.

<Distance Information Combining Unit>

Figure 6:
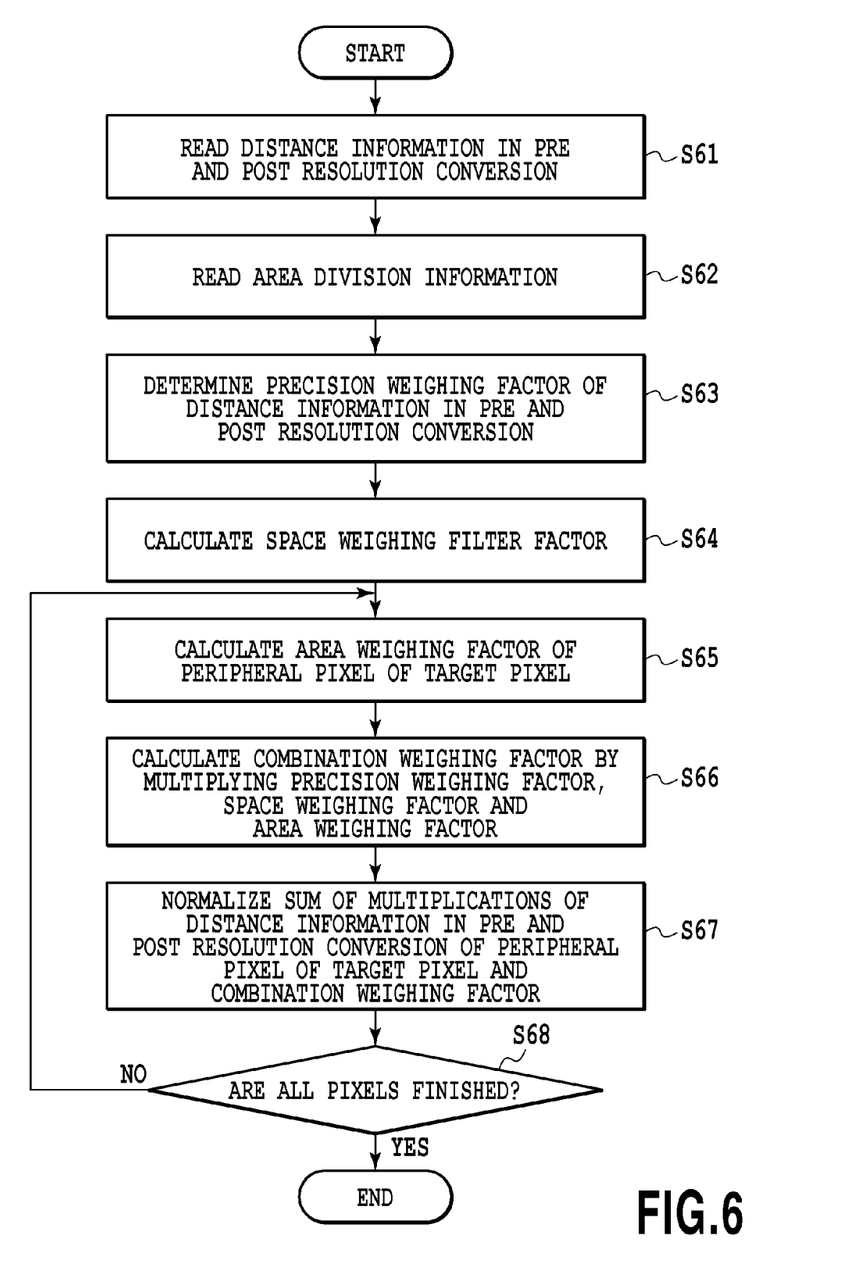
FIG. 6 is a flowchart showing an example of a distance information combination process in the embodiment 1.
Figure 7:
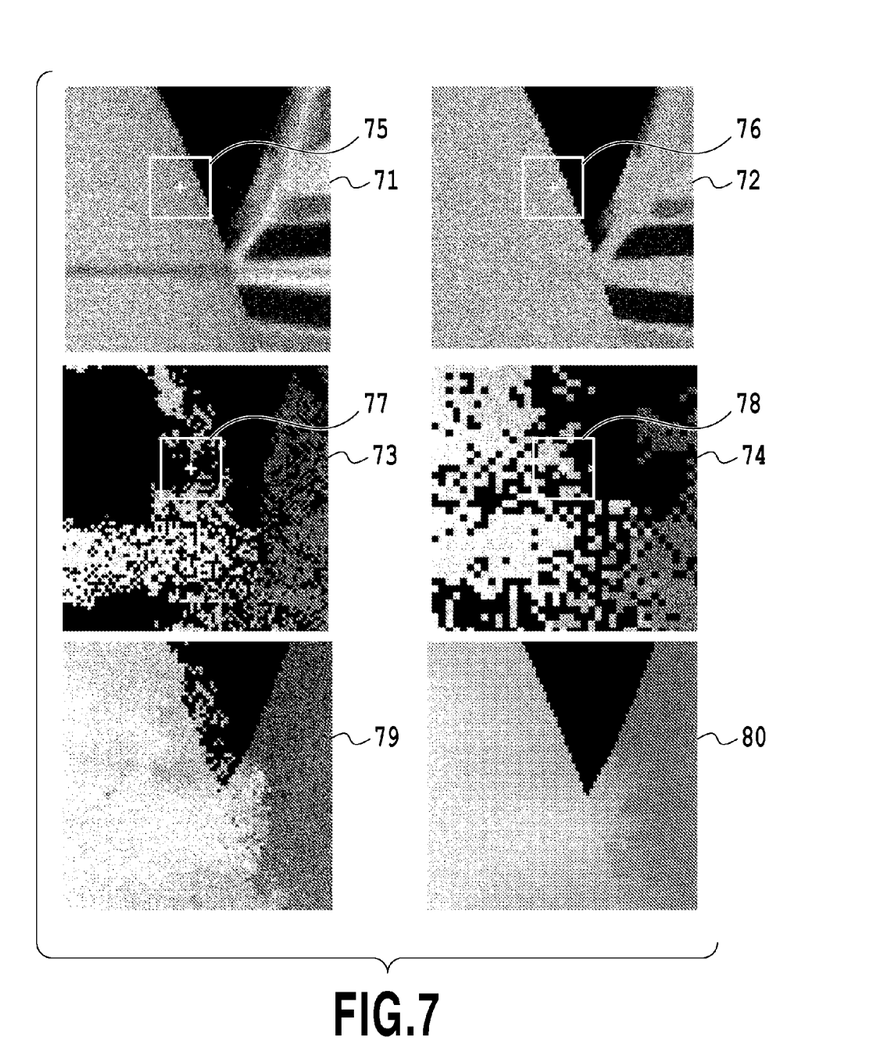
FIG. 7 shows an example of a pattern diagram of the distance information combination process in the embodiment 1.

A description will be in more detail given below of the combination process of the distance information of the distance information combining unit 16 with reference to a flowchart in FIG. 6 and a pattern diagram in FIG. 7. Note that the following combination process is applied to all the pixels of the standard image.

First, in step S61, the distance information combining unit 16 reads the distance information of the multi-viewpoint image in pre-resolution conversion and the distance information of the multi-viewpoint image in post-resolution conversion which are created in step S25. For example, the distance information in pre-resolution conversion for an input image 71 is denoted by reference numeral 73, and the distance information in post-resolution conversion is denoted by reference numeral 74.

Next, in step S62, the distance information combining unit 16 reads the area division information which is created in step S22. For example, the area division image for the input image 71 is denoted by reference numeral 72.

Next, in step S63, the distance information combining unit 16 sets a weighing factor (hereinafter, referred to as a precision weighing factor) which is different according to a precision, to each of the distance information of the multi-viewpoint image in pre-resolution conversion and the distance information of the multi-viewpoint image in post-resolution conversion. For example, in a case where the image in post-resolution conversion has a half of the resolution, the precision weighing factor (hereinafter referred to as a) in pre-conversion may be set to $\alpha=1$, and the precision weighing factor in post-conversion may be set to $\alpha=0.25$. In other words, although there may be a position which can not be partly estimated, a total precision can be thought to be higher in the distance estimation using the image having the higher resolution, than in the distance estimation using the image having the lower resolution. Accordingly, the precision weighing factor is set as mentioned above. The setting of the weighing is not limited to this.

Next, in step S64, the distance information combining unit 16 calculates a weighing filter factor (hereinafter, referred to as a space weighing filter factor) of the peripheral distance information for calculating the distance information of the target pixel. This can be achieved, for example, by setting a weighing factor of Gaussian function as shown by the following formula.

$$f(x,y;x0,y0)=1/(2\pi*\sigma^2)*\exp(-\tfrac{1}{2}*((x-x0)^2/\sigma^2+(y-y0)^2/\sigma^2)) \quad \text{(Formula 5)}$$

However, here, σ is a standard deviation of the Gaussian function, and x, y coordinate of the target pixel is set to x0, y0. For example, in a case where the target pixel is indicated by a plus mark ("+") and a filter area is indicated by a rectangle ("□") with white line in the input image 71, the space weighing filter can be expressed by reference numeral 75. The space weighing filter factor is weighed more as the distance to the target pixel is smaller.

Next, in step S65, the distance information combining unit 16 compares the area division information of the target pixel with the area division information of the peripheral pixel, and calculates a weighing factor (hereinafter, referred to as an area weighing factor). This can be achieved by setting the weighing factor of the Gaussian function as shown by the following formula.

$$g(x,y;x0,y0)=1/(\text{sqrt}(2\pi)*\sigma)*\exp(-\tfrac{1}{2}*((S(x,y)-S(x0,y0))^2/\sigma^2)) \quad \text{(Formula 6)}$$

Here, S(x, y) means a value of the area division image in the coordinate x, y. The standard deviation σ may be a different value from Formula 5. For example, in a case where the area division weighing filter is expressed on the area division image 72 in the same manner as the space weighing filter 75, it can be expressed by reference numeral 76. The area weighing factor is weighed more, for example, in an area in which the divided areas are similar in color.

Next, in step S66, the distance information combining unit 16 multiplies the calculated precision weighing factor, space weighing factor and area weighing factor, and calculates a weighing factor (hereinafter, referred to as a combination weighing factor) of the distance combination. This can be shown by the following function.

$$h(x,y;x0,y0)=\alpha*f(x,y;x0,y0)*g(x,y;x0,y0) \quad \text{(Formula 7)}$$

For example, describing in the same manner as the space weighing filter 75, the combination weighing filter of the distance information 73 in pre-resolution conversion can be expressed by reference numeral 77, and the combination weighing filter of the distance information 74 in post-resolution conversion can be expressed by reference numeral 78.

Next, in step S67, a sum of the multiplications of the distance information of pre-resolution conversion of the peripheral pixel of the target pixel, the distance information of post-resolution conversion of the peripheral pixel of the target pixel and the combination weighing factor is divided by a sum of the combination weighing factors so as to be normalized, thereby being set to the distance information of the target pixel. The area (black area) having no distance information in the distance information 73 and 74 is neither included in the multiplication sum nor included in the factor sum for normalization. Describing by the formula, the following formula can be obtained.

$$D(x0, y0) = \frac{\sum_{D_1(x,y)\neq 0} h(x, y; x0, y0)D_1(x, y) + \sum_{D_2(x,y)\neq 0} h(x, y; x0, y0)D_2(x, y)}{\sum_{D_1(x,y)\neq 0} h(x, y; x0, y0) + \sum_{D_2(x,y)\neq 0} h(x, y; x0, y0)} \quad \text{(Formula 8)}$$

Here, it is assumed that D1(x, y) is set to the distance information in pre-resolution conversion in the coordinate x, y, D2(x, y) is set to the distance information in post-resolution conversion in the coordinate x, y, and D1 (x, y)=0 and D2(x, y)=0 holds in the area having no distance information.

Finally, it is determined whether or not the processes for all the pixels are finished, and in the case where all the processes are not finished, the procedure returns to step S65, and in a case where all the processes are finished, the process of the distance information combining unit is finished. The resultant distance information is indicated as shown by combination distance information 79 in FIG. 7. In the distance information 79, the distance information which is missing in the detailed distance information 73 can be interpolated by the rough distance information 74 while leaving the information of the detail of the detailed distance information 73. Further, since the interpolation in the area is achieved by using the area information 72, there is an effect of preventing the edge from being blurred by interpolating.

Further, in a case where the edge part is desired to be made more smooth, combination distance information 80 may be created by carrying out the smoothing in the area by using the area division information 72 for the combination distance information 79.

It is possible to carry out the distance estimation having a higher coverage and a higher precision, by carrying out the processes as mentioned above.

In the present embodiment, the description is given of the combination of the results of the distance estimation of two kinds of resolutions, but a combination of three or more kinds can be achieved in the same manner as in the case of two kinds, by setting a reliability weighing in the number of combinations.

Further, in the present embodiment, the description is given of the example which uses the images obtained from a plurality of viewpoints in estimating the distance information, but it is possible to employ an aspect in which the distance information is estimated from one image obtained from one viewpoint.

Further, in the present embodiment, there is shown the example of the combination of the results of distance estimation of the images having the different resolutions, but it is possible to employ results of the other parameters which affect the precision and the coverage, for example, results of corresponding point searching methods of the area base having different magnitudes in reference area, without being limited to the resolution.

In the structure of the present embodiment, various constituting elements may exist in addition to the above, but since the other constituting elements are not the main feature of the present embodiment, a description thereof will be omitted.

Embodiment 2

In the embodiment 1, there is cited the example which combines the results of distance estimation in which the resolution of the distance information estimating unit 15 or the other parameter is different. In an embodiment 2, there will be cited an example of combining results of distance estimation in which basis for estimation is different according to different distance estimating method, for example, a method of estimating the distance from a whole picture composition, and a method of estimating the distance from a moving speed of the feature point. Even in a case where the distance estimating method is different, the distance information can be combined in the same manner as in the embodiment 1 as long as the distance information having a higher precision and a lower coverage is combined with the distance information having a lower precision and a higher coverage.

<Distance Information Estimating Apparatus>

Figure 8:
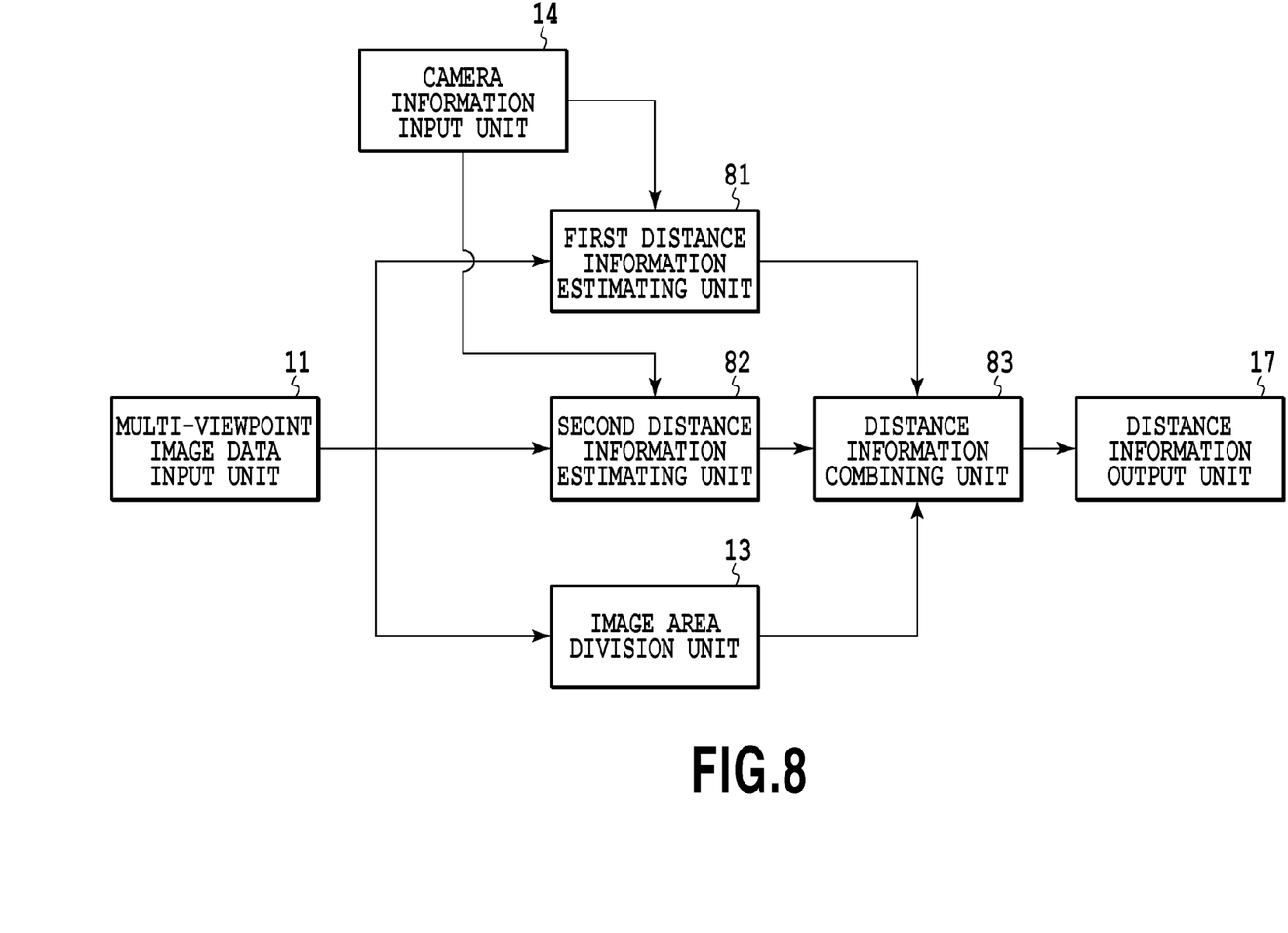
FIG. 8 is a block diagram showing an example of a distance information estimating apparatus in an embodiment 2.

FIG. 8 is a view showing an example of a structure of a distance information estimating apparatus according to the embodiment 2. The distance information estimating apparatus according to the embodiment 2 has a multi-viewpoint image data input unit 11, an image area division unit 13, a camera information input unit 14, a distance information output unit 17, a first distance information estimating unit 81, a second distance information estimating unit 82, and a distance information combining unit 83. The same reference numerals as those of FIG. 1 are attached to the same structures as those of the embodiment 1.

Figure 9:
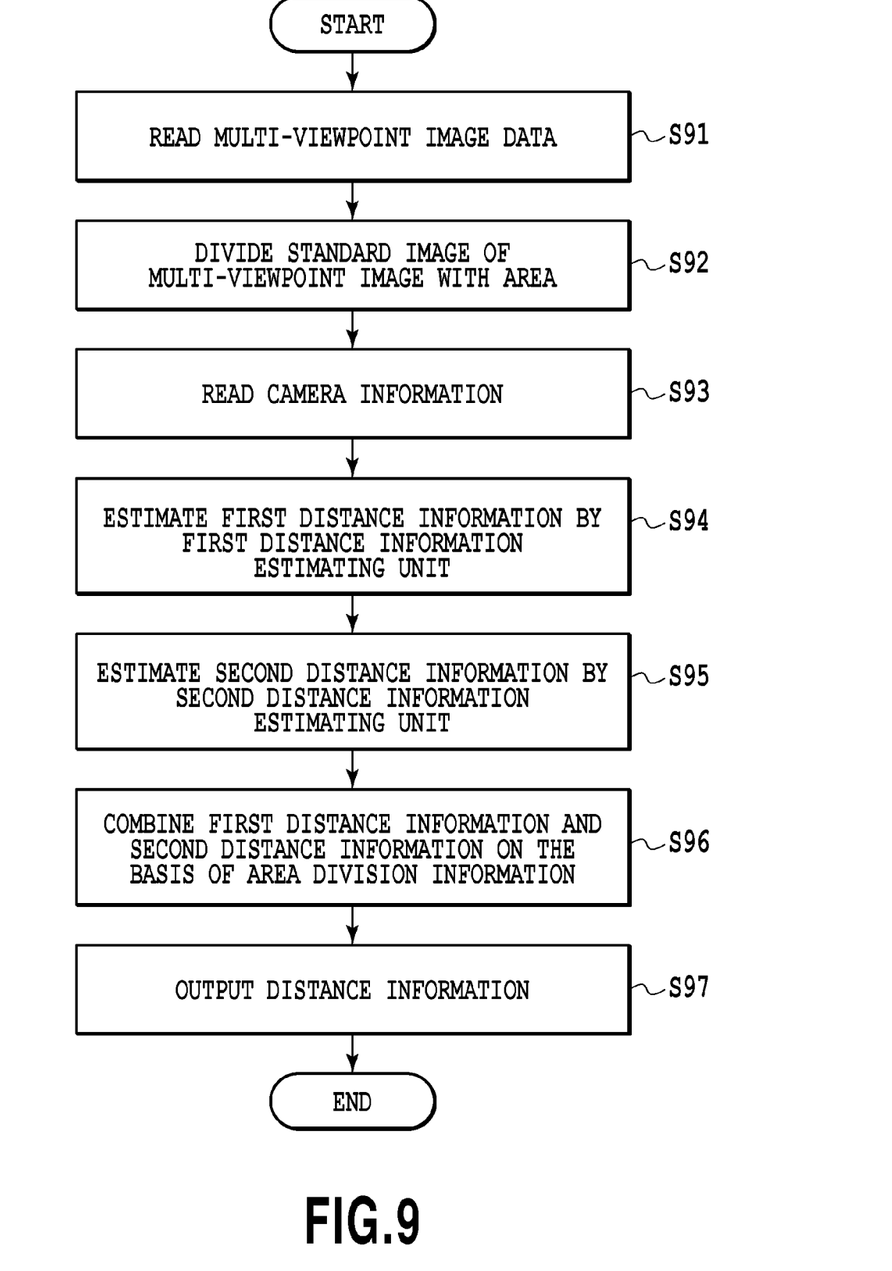
FIG. 9 is a flowchart showing an example of a distance information estimation process in the embodiment 2.

FIG. 9 is a flowchart of a process of the distance information estimating apparatus. A description will be given below of a process flow of the distance information estimating apparatus according to the embodiment 2 by using FIGS. 8 and 9.

Since steps S91 and S92 to S93 are the same as steps S21 and S23 to S24, a description thereof will be omitted.

Next, in step S94, the first distance information estimating unit 81 estimates distance information (hereinafter, referred to as first distance information) of a multi-viewpoint image.

Next, in step S95, the second distance information estimating unit 82 estimates distance information (hereinafter, referred to as second distance information) of the multi-viewpoint image.

Note that, it is assumed that the first distance information estimating unit 81 and the second distance information estimating unit 82 use different distance estimating methods, respectively. Further, it is assumed that the first distance information and the second distance information, which are the results of the different distance estimation methods, are different in precision and coverage. However, the first distance information and the second distance information do not necessarily have the same tendency in all the surfaces of the image, but the accurate distance information may be changed according to a feature of the image, for example, the precision of the first distance information is higher in a dark part of the image, and the precision of the second distance information is higher in a bright part of the image.

Next, in step S96, the distance information combining unit 83 combines the first distance information and the second distance information. A process of the distance information combining unit 83 will be mentioned later.

Finally, in step S97, the distance information output unit 17 outputs the distance information which is combined in step S96.

<Distance Information Combining Unit>

Figure 10:
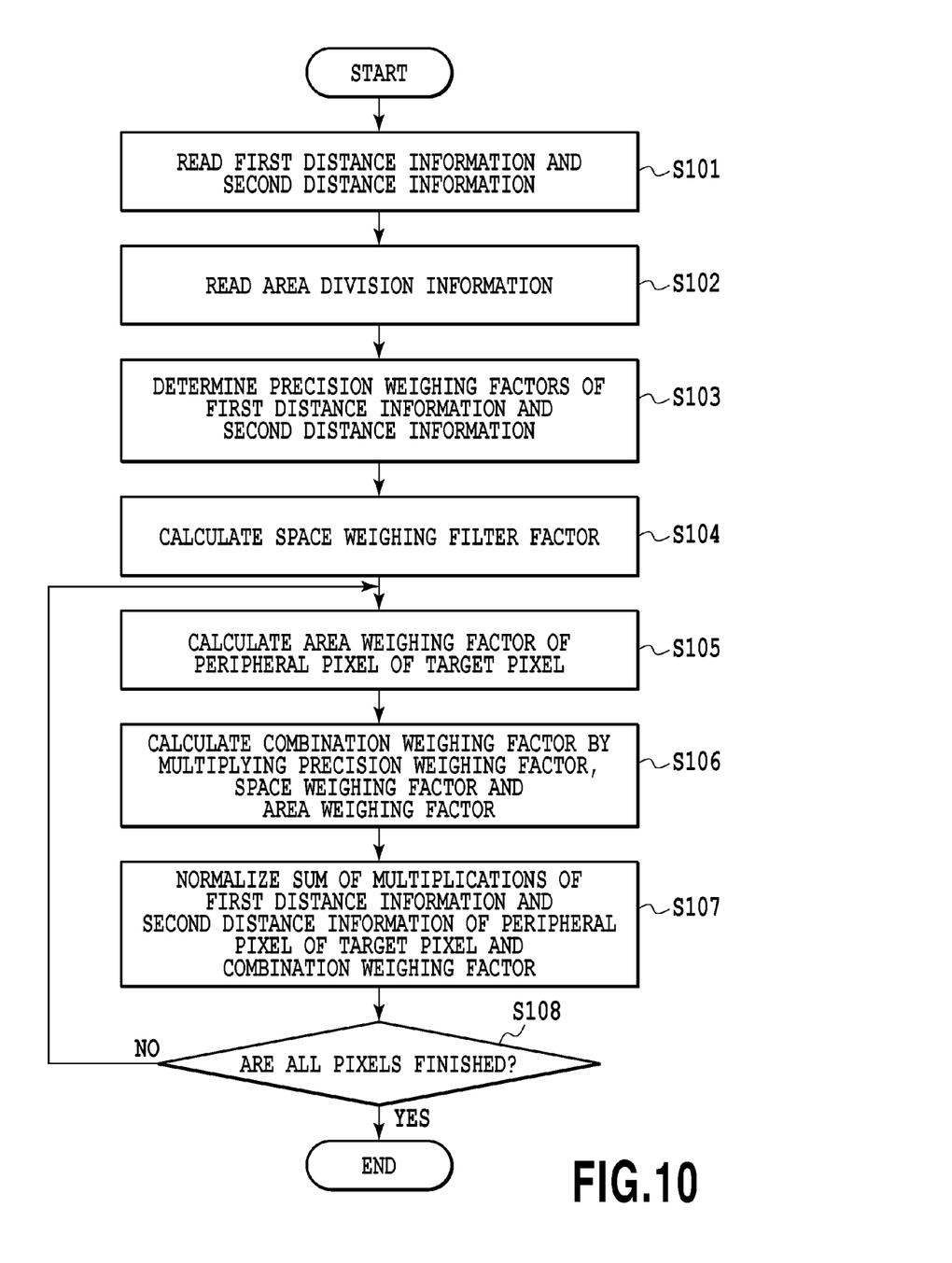
FIG. 10 is a flowchart showing an example of a distance information combination process in the embodiment 2.

A description will be in more detail given below of a combination process of the distance information of the distance information combining unit 83 by using a flowchart in FIG. 10. The following combination process is applied to all the pixels of the standard image.

First, in step S101, the distance information combining unit 83 reads the first distance information which is created in step S94, and the second distance information which is created in step S95.

Since step S102 is the same as step S62, a description thereof will be omitted.

Next, in step S103, the distance information combining unit 83 sets to the first distance information and the second distance information a weighing factor (hereinafter, referred to as a precision weighing factor) which is different according to a precision. The precision weighing factor may be weighed more for the information having the higher precision as long as the first distance information and the second distance information have the same tendency in the superiority of precision in the whole screen. Further, in a case where the tendency in the superiority of precision is different according to the feature of the image, a different precision factor may be set according to the feature of the image in the screen.

Since steps S104 to S106 are the same as steps S64 to S66, a description thereof will be omitted.

Next, in step S107, the distance information combining unit 83 divides a sum of the multiplications of the combination weighing factor, the first distance information and the second distance information of the peripheral pixel of the target pixel, by a sum of the combination weighting factors for normalization, and sets the normalized sum as the distance information of the target pixel. Note that values of the areas in which no distance data exists in the first distance information and the second distance information are included neither in the sum of the multiplications, nor in the sum of the factors for normalization.

Finally, the distance information combining unit 83 determines whether or not the processes of all the pixels are finished, and in a case where the processes are not finished, the procedure returns to the step S105, and in a case where the processes are finished, the processes of the distance information combining unit are finished.

By carrying out the processes mentioned above, it is possible to carry out the distance estimation having the higher coverage and the higher precision even in the results of the different distance estimating methods.

Note that, in the present embodiment, the description is given of the combination of the results of the distance estimation of two kinds of resolutions, but a combination of three or more kinds can be achieved in the same manner as in the case of two kinds, by setting a reliability weighing in the number of combinations.

In the structure of the present embodiment, various constituting elements may exist in addition to the above, but since the other constituting elements are not the main feature of the present embodiment, a description thereof will be omitted.

The description is given above of one example of the structure of the distance information estimating apparatus. A computer may be incorporated in the distance information estimating apparatus described above. The computer includes a main control unit, such as a CPU, and a memory unit, such as a read only memory (ROM), a random access memory (RAM) or a hard disc drive (HDD). Further, the computer additionally includes an input and output unit, such as a keyboard, a mouse, a display or a touch panel, and a communication unit, such as a network card. These constituting units are connected with each other via a bus, and controlled by execution of a program stored in the memory unit by the main control unit.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-191315, filed Aug. 31, 2012, which is hereby incorporated by reference herein in its entirety.

What is claimed is:

1. A distance information estimating apparatus comprising:
a first acquiring unit configured to acquire first image data of a first resolution;

a second acquiring unit configured to acquire second image data of a second resolution, wherein the first image data and the second image data correspond to the same scene;

a distance information estimating unit configured to estimate first distance information by using the first image data and to estimate second distance information by using the second image data; and a distance information combining unit configured to combine the first distance information and the second distance information.

2. The distance information estimating apparatus according to claim 1, wherein the distance information estimating unit estimates the first distance information and the second distance information on the basis of camera information corresponding to the image data.

3. The distance information estimating apparatus according to claim 1, wherein the distance information combining unit combines the first distance information and the second distance information on the basis of area division information obtained by dividing an area of the first image data and the second image data.

4. The distance information estimating apparatus according to claim 3, wherein the distance information combining unit sets a weighing factor of the combination on the basis of the area division information.

5. The distance information estimating apparatus according to claim 1, wherein the distance information combining unit sets a weighing factor of the combination on the basis of the precision of each piece of the distance information.

6. The distance information estimating apparatus according to claim 1, wherein the image data represents a multi-viewpoint image obtained from a plurality of viewpoints.

7. The distance information estimating apparatus according to claim 1, wherein the distance information combining unit sets a weighing factor of the combination for the first distance information and the second distance information on the basis of the first resolution and the second resolution, and the distance information combining unit combines the first distance information and the second distance information by using the weighting factor set on the basis of the first resolution and the second resolution.

8. The distance information estimating apparatus according to claim 7, wherein the distance information combining unit sets a larger weighing factor for the first distance information than a weighing factor for the second distance information in a case where the first resolution is higher than the second resolution and sets a larger weighing factor for the second distance information than a weighing factor for the first distance information in a case where the second resolution is higher than the first resolution.

9. A distance information estimating apparatus comprising:

a first distance information estimating unit configured to estimate first distance information of an image represented by image data by using a first estimating method;

a second distance information estimating unit configured to estimate second distance information of the image by using a second estimating method different from the first estimating method; and a distance information combining unit configured to combine the first distance information and the second distance information, wherein the first estimating method and the second estimating method have different precisions from each other.

10. The distance information estimating apparatus according to claim 9, wherein at least one of the first distance information estimating unit and the second distance information estimating unit estimates the distance information on the basis of camera information corresponding to the image data.

11. A distance information estimating method comprising the steps of:

acquiring first image data of a first resolution;

acquiring second image data of a second resolution, wherein the first image data and the second image data correspond to the same scene;

estimating first distance information by using the first image data;

estimating second distance information by using the second image data; and combining the first distance information and the second distance information.

12. A non-transitory computer readable storage medium storing a program which causes a computer to perform the distance information estimating method according to claim 11.

13. A distance information estimating method comprising the steps of:

estimating first distance information of an image represented by image data by using a first estimating method;

estimating second distance information of the image by using a second estimating method different from the first estimating method; and combining the first distance information and the second distance information, wherein the first estimating method and the second estimating method have different precisions from each other.

14. A non-transitory computer readable storage medium storing a program which causes a computer to perform the distance information estimating method according to claim 13.

15. A distance information estimating apparatus comprising:

an acquiring unit configured to acquire image data and resolution-converted image data, the resolution-converted image data being obtained by converting the resolution of the image data;

a distance information estimating unit configured to estimate distance information of an image represented by the image data and distance information of a resolution-converted image represented by the resolution-converted image data; and a distance information combining unit configured to combine the distance information of the image and the distance information of the resolution-converted image, wherein the acquiring unit acquires two kinds or more of resolution-converted image data with two kinds or more of different resolutions, wherein the distance information estimating unit estimates the distance information of two kinds or more of the resolution-converted images, and wherein the distance information combining unit combines the distance information of the image and the distance information of the resolution-converted image using the distance information of two kinds or more of the resolution-converted images.

16. A distance information estimating method comprising:

acquiring image data and resolution-converted image data, the resolution-converted image data being obtained by converting the resolution of the image data;

estimating distance information of an image represented by the image data and distance information of a resolution-converted image represented by the resolution-converted image data; and combining the distance information of the image and the distance information of the resolution-converted image, wherein the acquiring step includes acquiring two kinds or more of resolution-converted image data with two kinds or more of different resolutions, wherein the estimating step includes estimating the distance information of two kinds or more of the resolution-converted images, and wherein the combining step combines the distance information of the image and the distance information of the resolution-converted image using the distance information of two kinds or more of the resolution-converted images.

17. A non-transitory computer readable storage medium storing a program which causes a computer to perform the distance information estimating method according to claim 16.

* * * * *